United States Patent [19]

Brown

[11] Patent Number: 4,538,964
[45] Date of Patent: Sep. 3, 1985

[54] MULTISTAGE RESONANT COMPRESSOR

[75] Inventor: Alec T. Brown, Ballston Lake, N.Y.

[73] Assignee: Mechanical Technology Incorporated, Latham, N.Y.

[21] Appl. No.: 568,130

[22] Filed: Jan. 4, 1984

[51] Int. Cl.³ .................... F04B 25/00; F04B 35/04; H02K 33/02

[52] U.S. Cl. .................................. 417/267; 417/363; 417/372; 417/418; 310/30

[58] Field of Search .............. 417/267, 254, 244, 418, 417/417, 416, 53, 268, 266, 363, 372; 310/27, 30

[56] References Cited

U.S. PATENT DOCUMENTS

| | | | |
|---|---|---|---|
| 2,721,453 | 10/1955 | Reutter | 417/418 |
| 3,274,795 | 9/1966 | Fowle et al. | 417/417 |
| 3,286,911 | 11/1966 | Clarke | 417/254 |
| 3,336,488 | 8/1967 | Scott | 310/30 |
| 3,461,806 | 8/1969 | Barthalon | 417/418 |
| 3,947,155 | 3/1976 | Bidol | 310/27 |
| 4,201,523 | 5/1980 | Olofsson | 417/372 |
| 4,334,833 | 6/1982 | Gozzi | 417/268 |

FOREIGN PATENT DOCUMENTS 675958  7/1952  United Kingdom .............. 417/416

Primary Examiner—Cornelius J. Husar
Assistant Examiner—Peter M. Cuomo
Attorney, Agent, or Firm—Joseph V. Claeys; Charles W. Helzer

[57] ABSTRACT

A multistage resonant reciprocating compressor having opposed cylinders that are driven by a plunger unit. The plunger unit is suspended between a pair of spaced apart flexure springs and is electrically coupled to a linear motor mounted between the springs. The forces acting on the cylinder piston located on one side of the plunger unit are balanced against the piston forces acting on the other side of the unit and the stiffness of the flexure springs arranged so that the natural frequency of the plunger is at or near the exciting frequency of the motor.

8 Claims, 13 Drawing Figures $$X = \frac{S}{2} \sin \omega T = \overline{X} \sin \omega T$$

$$P_{av} = \frac{1}{2\pi} \int_0^{2\pi} P\, d(\omega T)$$

$$P_S = \frac{1}{\pi} \int_0^{2\pi} P \sin \omega T (d\omega t)$$

$$P_C = \frac{1}{\pi} \int_0^{2\pi} P \cos \omega T (d\omega t)$$

MULTISTAGE RESONANT COMPRESSOR

BACKGROUND OF THE INVENTION

This invention relates to a resonant piston compressor that is reciprocated by a linear motor and, in particular, to a reciprocating compressor of this character wherein the multistage cylinder forces acting on both sides of the motor plunger unit are closely balanced and the natural frequency of the plunger unit is tuned to the exciting frequency of the motor to provide resonance at the design point of the system.

Resonant piston compressors have been known and used for some time. These machines usually involve a pair of opposed cylinders having pistons of equal size that are arranged to reciprocate so that one is on the compression side of the stroke while the other is on the suction side. As explained by Curwen in U.S. Pat. Nos. 3,303,990; 3,329,334 and 3,156,405, all of which are assigned to the present assignee, the pistons can be driven by means of coacting solenoids wherein each piston contains an outwardly disposed iron core that is coupled electromagnetically to a transducer. By pulsing the transducers in an ordered sequence, the pistons are made to reciprocate within the compression cylinders. A fairly large flexure spring unit is used to connect the piston assembly of the machine to the machine casing. The spring includes two U-shaped sections that protrude outwardly through the casing and which are tuned so that the mechanical and electromagnetic frequencies of the system are at resonance.

Although the Curwen type compressor works quite well in a number of different applications, the cylinders cannot be interstaged to raise the pressure of the working substance in steps and the output capacity of the compressor is thus limited. As can be seen, if the opposed cylinders of the Curwen compressor were staged, the forces acting on the piston assembly would become unbalanced and the flexure spring would be unable to hold the system at or near resonance. It should also be noted that the flexure spring takes up a good deal of space to either side of the casing. Furthermore, because the flexure spring is not internally contained within the casing, it is extremely difficult to immerse the compressor in a coolant and other, less desirable, forms of cooling must be employed to dissipate the heat of compression.

In U.S. Pat. Nos. 3,937,600; 4,353,220 and 4,067,667, all which are assigned to the present assignee, there is shown another type of resonant piston compressor wherein the flexure spring is replaced by a gas spring system for attaining resonance. The gas spring is fully contained within the machine casing and the entire assembly is housed in a fluid tight shell immersed in a bath of cooling oil. Here again two symmetrical pistons are driven in opposition by a linear motor to balance the forces on either side of the rotor. Dashpots, which act as gas springs, are operatively connected to each piston. The stiffness of each gas spring is adjusted in reference to the oscillation of the motor armature assembly to produce resonance at the desired design point. Upsetting the pressure balance between cylinders, as for example by staging the compression, would again adversely affect the resonant characteristics of the system.

SUMMARY OF THE INVENTION

It is therefore an object of the present invention to improve resonating piston compressors.

It is a further object of the present invention to provide a balanced multistage compressor that is easily tuned to resonance by means of a flexure spring assembly.

Another object of the present invention is to provide a multistage piston compressor having a linear drive motor wherein the motor armature assembly is suspended between a pair of coacting flexure springs.

A still further object of the present invention is to provide a sealed resonant piston compressor that is tuned by means of a pair of flexure springs contained fully within a sealed machine casing.

Another object of the present invention is to minimize the number of sliding contact surfaces utilized in a resonating piston compressor.

Still another object of the present invention is to provide a multistage resonating piston that is driven by a bearingless linear motor having an armature assembly suspended between a pair of flexure springs.

A still further object of the present invention is to provide a multistage resonating piston that is capable of delivering relatively high pressures in a minimum amount of space.

It is a further object of the present invention to incorporate a flat linear motor having a flat plunger in a multistage compressor to provide a compact package.

These and other objects of the present invention are attained by a multistage piston compressor that is driven by a reciprocating linear motor. The pistons of the interstaged compression cylinders are connected to both sides of the motor armature to provide a reciprocating plunger assembly. The cylinders are arranged so that the forces acting on both sides of the plunger are substantially equal. The plunger assembly, in turn, is suspended between two coacting mechanical flexure springs that function to maintain the natural frequency of the plunger at or near to the exciting frequency of the motor. The mechanical springs have a relatively large width in a direction transverse to the plunger motion to provide stiffness across the motor gap that is sufficient to keep the plunger centered in the gap.

BRIEF DESCRIPTION OF THE DRAWINGS

For a better understanding of these and other objects of the present invention reference is had to the following detailed description of the invention which is to be read in conjunction with the following drawings, wherein:

FIG. 8a is a pressure versus time graph representing the pressure developed in the cylinders during a complete piston cycle and FIGS. 8b–8d are harmonic components of the pressure shown in FIG. 8a;

DESCRIPTION OF THE INVENTION

Figure 1:
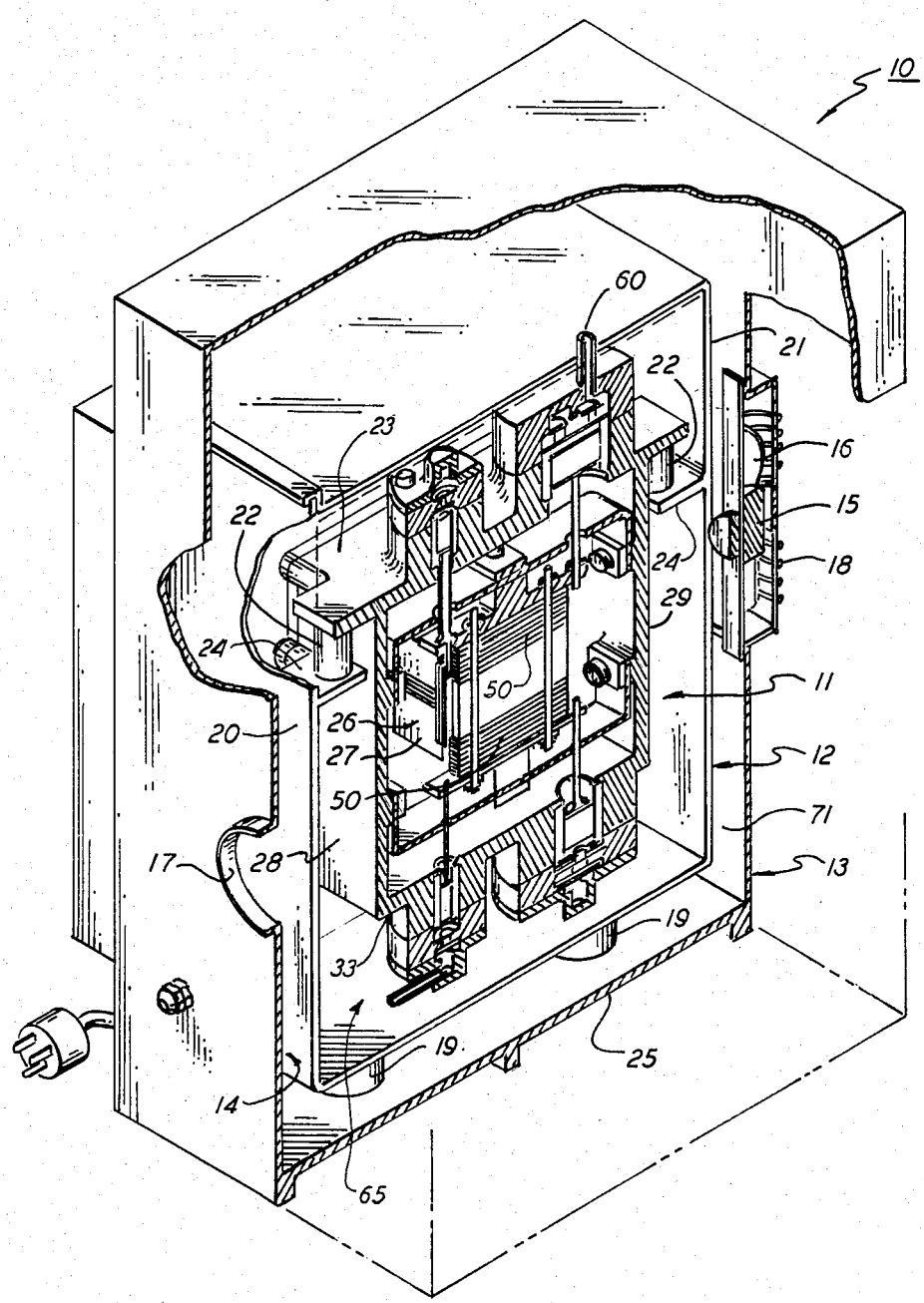
FIG. 1 is a perspective view of a multistage resonating piston compressor embodying the teachings of the present invention with portions broken away to show the inner construction thereof.
Figure 2:
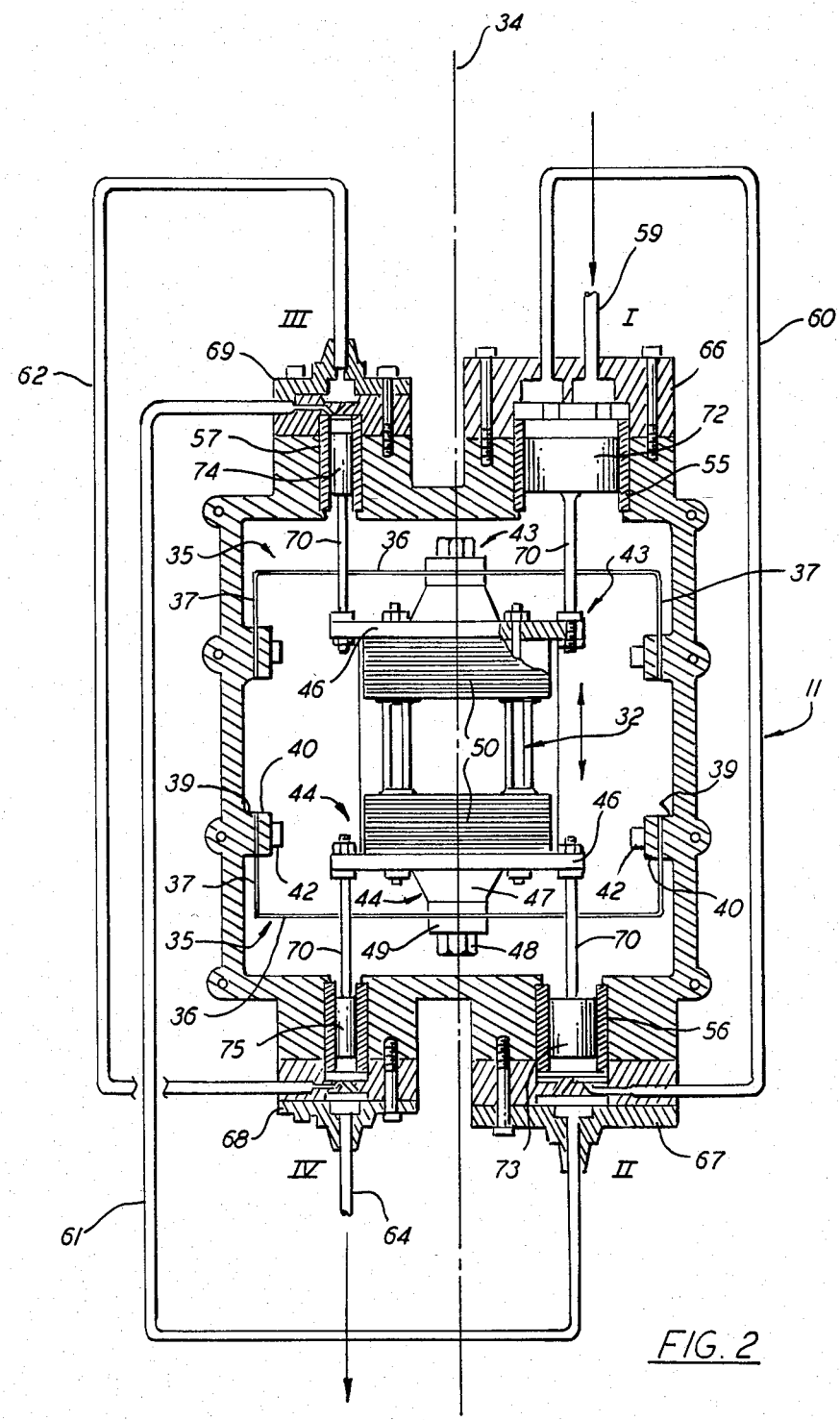
FIG. 2 is a sectional view of the compressor casing shown in FIG. 1 taken along the vertical axes of the compressor motor.
Figure 3:
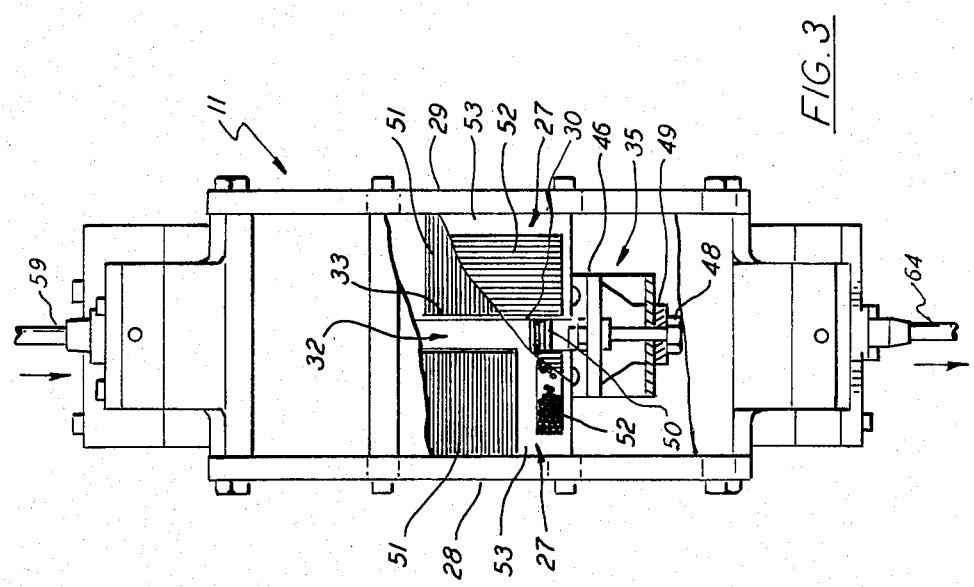
FIG. 3 is a side elevation of the compressor casing shown in FIG. 1 with portions broken away to further illustrate the linear motor construction utilized therein.
Figure 5:
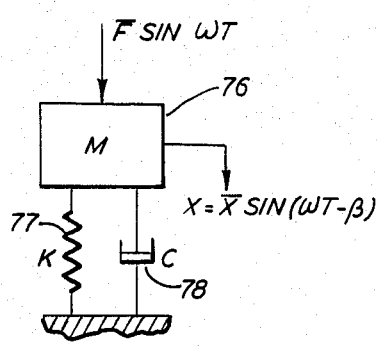
FIG. 5 is a force diagram illustrating a one-degree-of-freedom damped system embodied in the present compressor.
Figure 6:
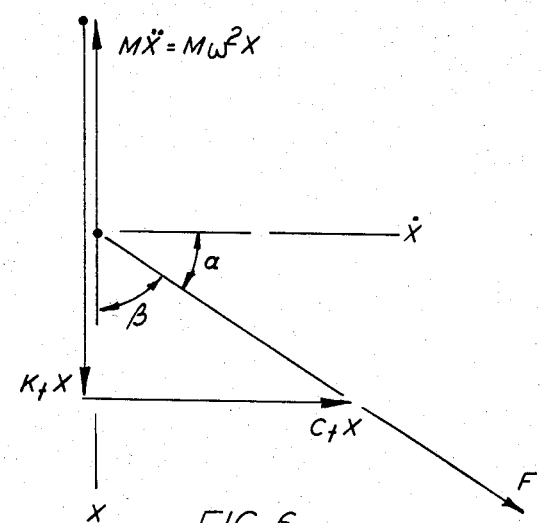
FIG. 6 is a vector diagram showing the phase relationship of the forces acting on the present compressor.

Turning now to the drawings, there is shown in FIGS. 1–3 a resonant piston compressor generally referenced 10 that contains four compression cylinders I–IV that are interconnected to provide four stages of compression. As best seen in FIG. 1, the compressor includes an inner casing 11 that is contained within a fluid tight housing 12. The housing is filled with a coolant, such as oil, which completely immerses the casing. The housing 12 is, in turn, enclosed within an outer jacket 13 to provide an air chamber 14 between the housing and the jacket. A motor 15 is secured to the back wall of the jacket which drives a fan 16 adapted to either draw or push air through the chamber. When using the compressor with an inflamable or explosive gas, such as methane, operation of the fan in the blow or push mode provides a significant safety feature and avoids the need for an explosion proof motor. Ambient air is drawn into the chamber through an inlet port 17 and circulated about the compressor housing before being exhausted back to atmosphere through a rear grill 18. The circulating air serves to carry the heat of compression out of the system and thus further cool the system.

The compressor housing is supported upon the bottom wall 25 of the jacket by means of a pair of base mounts 19—19. The base mounts are preferably formed of a soft rubber that is capable of minimizing the effects of vibrational forces. The compressor casing is similarly suspended between the side walls 20 and 21 of the housing by means of top mounts 22—22 that are adapted to act between the top wall 23 of the casing and a pair of wall brackets 24—24 that are inwardly disposed from the side walls of the casing.

The present apparatus provides a sealed package that can be conveniently stored and operated in either an indoor or outdoor environment. Although the present apparatus has been specifically designed to compress methane gas used as a fuel in an internal combustion engine, it should become evident from the disclosure below that the compressor can be employed in any number of similar applications requiring the use of a small compact machine with an overall compression ratio up to approximately 1000:1. The machine employs a bearing free design and is thus capable of delivering almost maintenance free service over many hours of operation. In the event that repairs are required, the machine can be easily broken down and reassembled without difficulty using standard tools.

The compressor is driven by a linear motor, generally depicted at 26, that is completely contained within the compressor casing. The motor includes a pair of symmetrical stator sections 27—27 that are affixed to removable end plates 28 and 29 and which, in assembly, provide a gap 30 therebetween. A plunger assembly 32 reciprocally drives the pistons of the compressor. The plunger assembly is suspended in the gap between the top wall 23 and the bottom wall 33 of the casing along the axis 34 of the compressor. The plunger assembly is suspended between a pair of U-shaped flexure springs 35—35 the function of which will be explained in greater detail below.

Each mechanical flexure spring is fabricated from a single sheet of flat spring steel that is turned inwardly at both ends to provide a leg 37 at each end. In assembly, the end legs are secured to mounting pads 39—39 that are disposed inwardly from the compressor casing sidewalls. Each leg is connected to a companion pad by means of a washer 40 and a cap screw 42 adapted to pass through both the washer and the end flange and which is threaded into the adjacent pad. The body 36 of each flexure spring is perpendicularly aligned with the axis 34 of the machine when the spring is in an unflexed condition.

The plunger assembly of the linear motor is connected to both of the flexure springs by means of a top mounting bracket 43 and bottom mounting bracket 44. Each bracket is of similar construction and includes a flat plate 46 having a central outwardly protruding hub 47 that is adapted to rest against the inside surface of an adjacent spring. A centrally located locking bolt 48 passes through flat washer 49 and the spring body 36 and is threaded into the hub to secure the plunger assembly to the spring. The plunger assembly is thus suspended between the motor stators by the springs. Because of their U-shaped or channel-like construction, the springs are able to flex toward and away from the top and bottom wall of the compressor as the plunger is reciprocated along a linear path of travel.

The plunger assembly also contains a pair of spaced apart armature laminations 50—50 that are electro-magnetically coupled to the stator windings. As shown in FIG. 3, each stator section contains a dc winding 51 and an ac winding 52 that are wrapped about a common iron core 53. The dc windings are wrapped perpendicular to the axis of the motor at the center of the core while the ac windings extend parallel to the axis of the motor generally along the length of the core. A 60 Hz source of power is applied to the ac windings which causes a current to flow in the stator sections of the motor. This, in turn, interacts with the magnetic field associated with the dc coils to provide an electromagnetic couple between the motor stator and the armature to reciprocally drive the plunger assembly along the noted linear path of action.

The magnetic flux produced by the energized dc windings will remain constant as the plunger reciprocates. The force acting between the ac windings and the armature, however, changes and is proportional to the amount of current passing through the ac coils and the number of turns in each coil. The velocity of the plunger is thus out of phase with the ac current by a phase angle $\alpha$ that is a function of the mechanical mass of the system, its spring rate and damping characteristics. As the plunger reciprocates, the magnetic flux of the dc windings cuts across the ac force field at the plunger velocity whereby the plunger, in a sense, moves the ac field back and forth between two extreme positions to induce an electromotive force (emf) in the windings. The rate of change of the flux crossing the windings is thus in phase with the plunger and is proportional to the magnitude of the dc flux.

As best illustrated in FIG. 2, the four compression cylinders I-IV are of conventional construction. The working area of the cylinders is reduced in progression from the inlet cylinder I to exhaust cylinder IV. Each cylinder contains a cylindrical sleeve 55-58 that is press fitted into the receiving wall of the compressor casing opposite the plunger assembly. Sleeves 55 and 57 are fitted within the top wall of the casing. Sleeves 56 and 58 are similarly fitted within the bottom wall of the casing. Opposed sleeves 55 and 56 are coaxially aligned in assembly as are sleeves 57 and 58. Each sleeve, in turn, is placed in parallel alignment with the axis of the plunger so that the pistons and the armature of the assembly move in the same plane.

The working gas, enters the inlet cylinder I via inlet line 59 and is then passed in succession through the remaining smaller cylinders II-IV via interconnecting lines 60-62 whereupon the substance is compressed in 20 stages before leaving the compressor via exhaust line 64. The lines 60-62 for connecting the cylinders are contained within a chamber 65 formed between the compressor housing and casing. A liquid 71, such as oil, is contained within the chamber and serves to cool the casing and the compressed substance passing between stages. Heat is transferred to housing 12 which is further cooled by the air circulating through the space 14. Each cylinder is closed by means of a conventional bolt on head and gasket assemblies 66-69 that contain suitable inlet and outlet valves for cycling the substance through the cylinder. It is believed this type of head assembly is well known in the art and a further description is not necessary for a thorough understanding of the invention. Each cylinder contains a close fitting piston 72-75 that acts to compress the process gas.

Pistons 72 and 74 contained in the two upper cylinders are connected directly to the upper mounting bracket 43 of the plunger by means of linear rods 70—70 that are secured by any suitable means to the outboard ends of plate 46. Pistons 73 and 75 contained in the lower cylinders are similarly connected by rods 70—70 to lower mounting bracket 44 of the plunger. The rods, and the coacting pistons, are arranged to reciprocate with the plunger along a linear path of travel defined by the axis 34 of the motor. Because the plunger is directly linked to the pistons, bearing and sliding surfaces are substantially eliminated. Furthermore, because no sliding surfaces, except at the piston to sleeve interface, are present, friction is eliminated in the armature drive section thus reducing the demand on the motor and reducing the amount of heat generated within the casing. To avoid any tendency for the pistons to bind or wear due to imperfect concentricity between the rods and the pistons, the rods are not continuous with the pistons. The pistons 73-75 are simply held in biasing contact against these three rods without the benefit of a rigid connector. The action of cylinder pressure which, at all times, is greater than the casing pressure of the related cylinders provides a separable joint that accommodates misalignment of rods and pistons without transmitting transverse forces to the piston.

Figure 4:
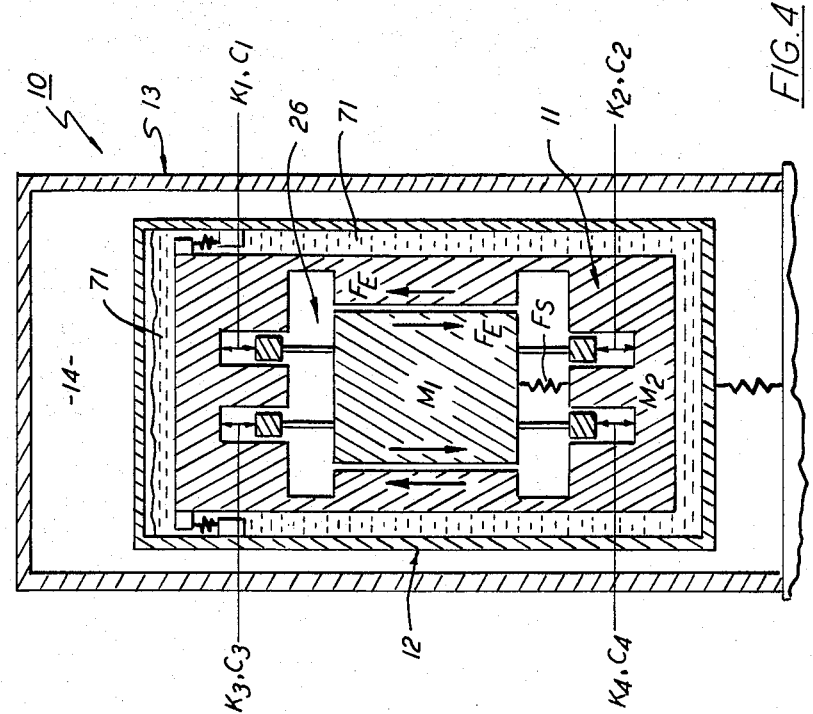
FIG. 4 is a schematic view of the present compressor showing the forces acting upon various components of the system.

With further reference to FIGS. 4-8, the theory of operation of the present compressor will be explained in greater detail. As illustrated in FIG. 4, the housing and compressor casing which houses the motor stator along with the cylinder sleeves and head assemblies may all be considered a single mass $M_2$ while the plunger assembly including the attached pistons can be considered a second mass $M_1$. As can be seen, equal but opposite forces are transmitted through each of the masses. These forces include an electromagnetic force (emf) that is established across the gap between the armature and the stator of the linear motor along with the gas spring forces generated in the cylinders which act between the plunger and the compressor casing. A third mechanical force is also created by the action of the flexure springs as they deflect in response to the plunger motion. The latter mechanical force is imparted to both the plunger and the casing to which the flexure springs are anchored.

The reciprocating motion of the plunger and attached pistons relative to the compressor casing produces the desired compression cycle upon the working gas contained in each of the cylinders. The stroke of the plunger is determined by the response of the coupled masses to the three above noted forces. It should be noted that the magnitude of the emf, noted as $F_E$ in FIG. 4 for a given delivery pressure and flow rate will decrease with an increase in stroke and will approach a minimum value as the system approaches resonance, that is, when the natural frequency of the moving plunger assembly approaches the exciting frequency of the motor. Since the motor size is also a function of emf, the size of the motor will correspondingly be minimized as a condition of resonance is approached.

FIG. 4 illustrates schematically the forces acting upon the compressor. As shown, each cylinder develops its own spring rate ($K_1$-$K_4$) and its own viscous damping ($C_1$-$C_4$). The emf or exciting force $F_E$ combines with the mass of the plunger $M_1$ and the mass of the casing $M_2$ to produce a second set of forces. Lastly, the mechanical flexure springs are arranged as described above to act between the plunger assembly and the compressor casing and develops an independent spring rate depicted as $F_S$. As will be explained in greater detail below, the cylinder forces acting on either side of the plunger assembly are placed as close to a balanced condition as possible and the system brought to resonance by adjusting the stiffness of the flexure springs.

The forces acting on the compressor can thus be described as a damped linear system having one degree of freedom. This system is shown diagrammatically in FIG. 5 wherein the mass 76 of the system is arranged to act against a spring 77 and a dashpot 78. The dynamics of the linear system are further described vectorially by the phase diagram of FIG. 6 wherein:

M = Mass in lb sec$^2$/in.
K = Spring rate lb/in.
C = Damper lb sec/in.
F = Exciting force, lb
X = Displacement from mid-stroke position, in.
f = Exciting frequency Hz
$\omega = 2\pi f$ rad/sec
$\beta$ = Phase angle between exciting force and displacement, (i.e., $\beta/\omega$ = time delay between the maximum force and maximum displacement).

Assuming that F and X are simple harmonics at the frequency and solving the resulting differential equation for the Second Law of Motion gives the following relationship:

$$\frac{\bar{X}}{\bar{F}} = \frac{1}{[(K - M\omega^2)^2 + (C\omega)^2]^{\frac{1}{2}}} \quad (1)$$

and $$\beta = \tan^{-1}\left[\frac{C\omega}{K - M\omega^2}\right] \quad (2)$$

From equations (1) and (2) it can be seen that $\overline{X}/\overline{F}$ is a maximum when $K - M\omega^2 = 0$ which is a definition of the condition of resonance. At this condition the maximum displacement lags the maximum force by 90°. Since the velocity is given by:

$$(dx/dt = \omega\overline{X}\cos(\omega t - \beta)) \quad (3)$$

for $\beta = 90°$; $(dx/dt) = \omega\overline{X}\sin\omega t$ (4)

As can be seen from (3) and (4) at resonance, the velocity of the plunger assembly is in phase with the exciting force.

As noted, the phase angle between the exciting force $F_E$ and the responding velocity X is defined by the angle $\alpha$ wherein:

$$\alpha = 90 - \beta \quad (5)$$

and at resonance $\alpha = 0$

The energy transferred to the damper (W) is obtained by intergrating the damper force ($C\omega X$) times its velocity $\omega X$ wherein:

$$W = \pi C\omega \overline{X}^2 \quad (6)$$

From equation 6 it can be seen that for a given energy transferred to the damper the force required is minimized by maximizing X and minimizing $K - M\omega^2$. The second condition is met when the system is tuned to a resonant condition.

The mass represented in FIG. 4 is the effective mass of the reciprocating assembly. This is the actual mass with a small adjustment made for the fact that the stator casing and supports to ground are not infinitely massive or rigid. The effective mass is 5 to 10% less than the actual reciprocating mass in practical designs. For a compressor mounted on soft springs and/or shock absorbers, the effective mass is given by:

$$M_e = \frac{M_p M_c}{M_p + M_c} \quad (7)$$

$M_p$ = mass of reciprocating plunger assembly
$M_c$ = mass of housing and other structure or material which moves with it.
$M_e$ = effective mass.

Since $M_c$ is much greater than $M_p$, $M_e$ is slightly less than $M_p$. At first glance the pressure time in a typical compression cylinder appears highly nonlinear, however, by breaking it down into components, using Fourier's theorem and dropping higher order terms, it can be very closely approximated by the following expression:

$$P = P_{av} + P_s \sin(\omega t - \beta) + P_c \cos(\omega t - \beta) \quad (8)$$

Figure 7:
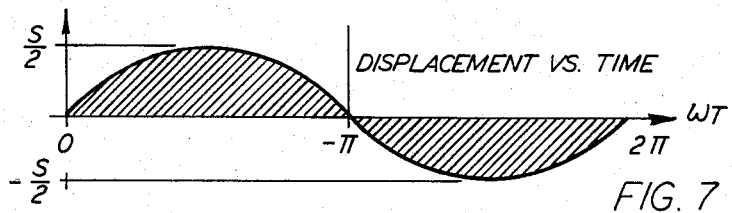
FIG. 7 is a displacement versus time graph representing the harmonic motion of the compressor pistons between a top dead center position and bottom top center position.
Figure 8A:
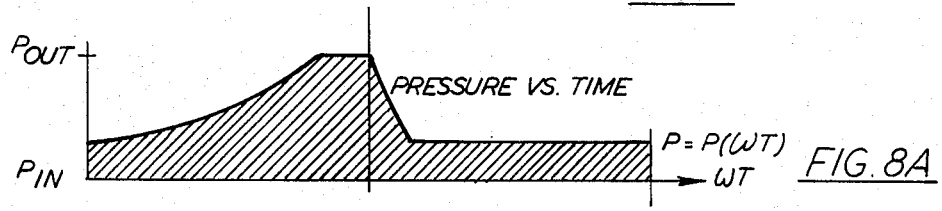
Figure 8B:
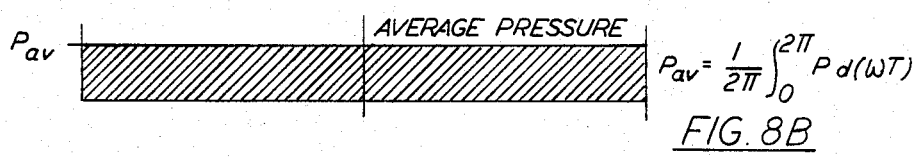
Figure 8C:
Figure 8D:
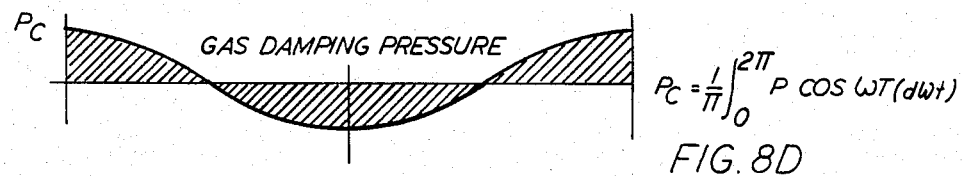

Multiplying by the piston area gives the total force on the piston during its stroke as the summation of a constant average force, a force that is in phase with the displacement and a force that is out of phase with the displacement. FIGS. 7 and 8 diagrammatically show these pressure components. By comparing the system response, Fourier's in-phase component can be considered as an equivalent spring with a stiffness equal to $P_c$ $A/\overline{X}$ and the out-of-phase force component as equivalent to a dash pot with a damping constant equal of $P_c$ $A/\omega\overline{X}$.

The first term of Equation (8) results in a steady force on the piston, which must be counteracted in some way. For multiple pistons driven by a single motor, each cylinder sees the same stroke. The force developed by each cylinder can be broken down into the three components of Equation (8). The total spring rate and damping constant provided by the cylinders is obtained by adding these components from each cylinder. This is shown mathematically at FIGS. 8a–8d. By incorporating cylinders on opposite sides of the plunger, the average force from each side can be approximately balanced. Since perfect balance is not possible, and a slight imbalance tends to an unstable drift, an auxiliary means of controlling mid-stroke offset must be incorporated. This is accomplished in the present compressor by adjusting the plunger mass and spring rate to give resonant behavior at the design point and by providing a spring with sufficient stiffness to stabilize the mid-stroke drift.

Each flexure spring support is dimensioned so that it is not subjected to excessive stress which could induce structural failure as the flexures are deflected repeatedly by the excited plunger assembly. The supports are also designed to withstand forces transverse to the plane of reciprocation of the plunger. The transverse stiffness in practice should be great enough to assure stability against any transverse magnetic forces that increase with their offset from the plane of transverse symmetry. By making the width of the spring about twenty times greater than its thickness, acceptable stiffness properties can be attained in all directions. In practice, the flexure springs are formed of high strength steel having high yield strength such that the springs can provide about 30 to 50% of the total spring stiffness required to reach a resonant condition. Accordingly, a good deal of flexibility in design is afforded by suspending the plunger between the flexures as pointed out above. Preferably each spring will have an a/S ratio of between about 6 and 10 wherein (a) is the distance from the center of the spring to one anchor point and (S) is the stroke length of the plunger. Similarly, it is preferred that the half length distance (a) of each spring be about twice the length of the inwardly turned spring legs 37—37 that are secured to the side wall of the casing.

Figure 9:
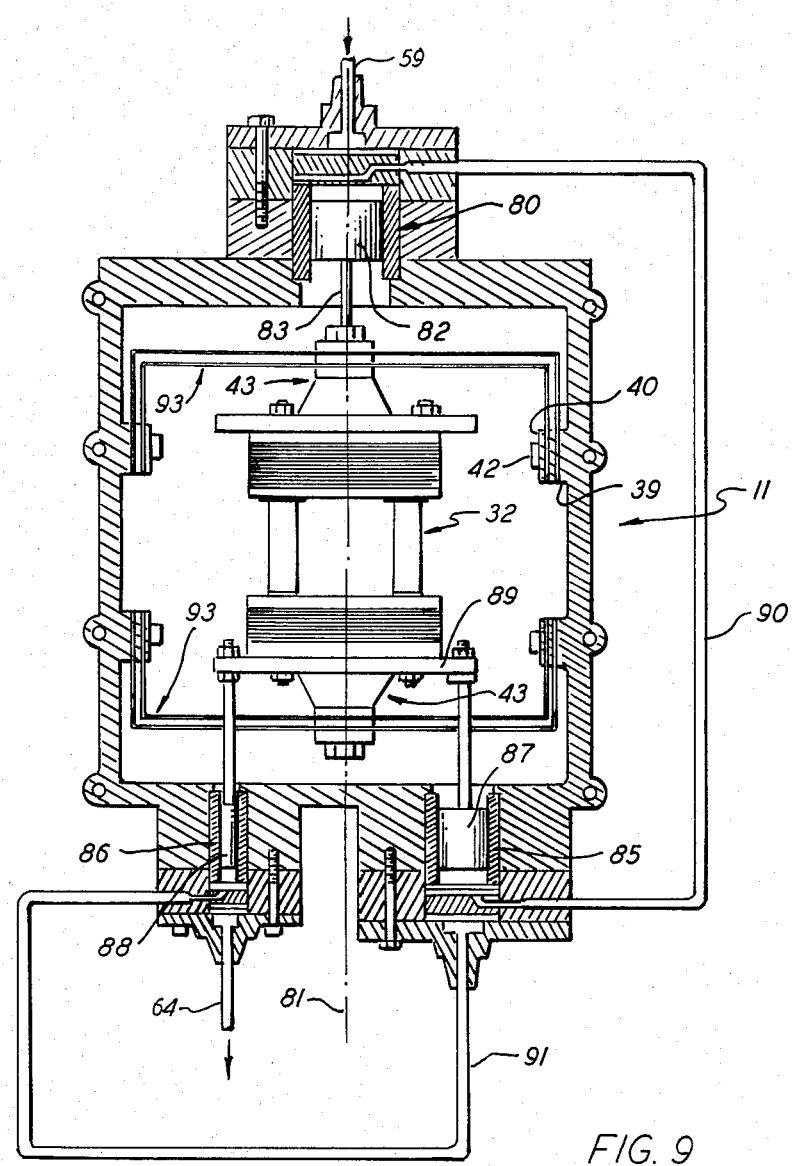
FIG. 9 is a sectional view similar to that shown in FIG. 2 showing a second embodiment of the present invention.
Figure 10:
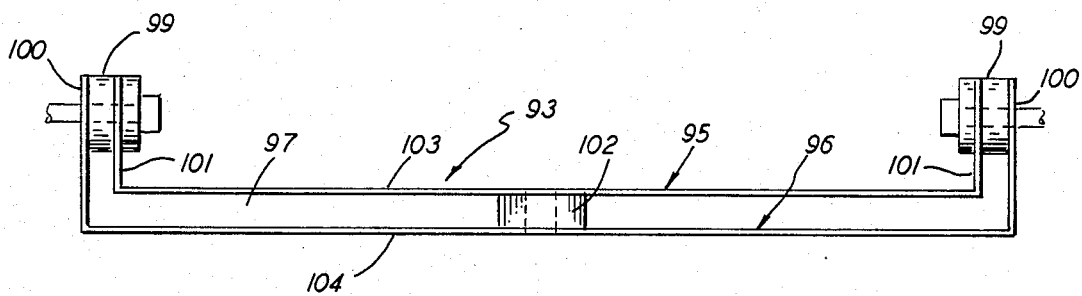
FIG. 10 is a side elevation of a dual flexure spring arrangement suitable for use in the present invention.

Although the present compressor is best configured with an even number of cylinders located on each side of the plunger assembly, it is possible to configure the compressor as shown in FIG. 9 where an odd number of cylinders are located on one side of the plunger and an even number are located on the other side. As shown in FIG. 9, a single inlet cylinder 80 is centered along the axis 81 of the linear motor. The piston 82 of the inlet cylinder is connected to the plunger assembly by a push rod 83. On the opposite side of the plunger assembly there is positioned an intermediate cylinder 85 and an exhaust cylinder 86. The pistons 87 and 88 of the two opposed cylinders are offset to either side of the compressor axis and are connected to a drive plate 89 secured to the bottom section of the plunger assembly as explained in greater detail above.

The inlet cylinder is connected to the intermediate cylinder by means of line 90 while the intermediate cylinder is similarly connected to the exhaust cylinder by means of line 91. Again the connecting lines are located between the compressor casing and the housing so that the lines are completely immersed in the coolant. The piston areas and the stroke of the plunger are arranged to provide a desired overall pressure ratio and flow rate over the cylinders. The flexure springs 93—93 and the mass of the plunger are adjusted so that in conjunction with the stiffness of the gas in the cylinders, the reciprocating assembly has a resonant frequency at the desired flow and pressure range that is approximately equal to the exciting frequency of the linear motor.

In this particular embodiment of the invention, each flexure spring 93 is made up of two superimposed sections or leaves 95 and 96. The outer leaf 95 and inner leaf both have a U-like configuration that is complementary so that leaf 96 can be contained within leaf 95 to permit a slight air gap 97 to be maintained therebetween. A pair of end spacers 99—99 are positioned between the adjacent legs 100 and 101 of the leaves while a single center spacer 102 is positioned between the body sections 103 and 104 of the two leaves. In assembly, the spacers permit each of the flexure elements to flex independently as the plunger assembly is reciprocated within the casing. This dual leaf arrangement provides for greater control over the spring stiffness and thus over the stroke of the compressor.

While this invention has been described with reference to the structure disclosed herein, it is not confined to the details set forth and this application is intended to cover any modifications or changes as may come within the scope of the following claims.

I claim:

1. A multistage reciprocating compressor comprising:
    a casing with sidewalls and opposed end walls;
    a linear motor having split stator sections affixed to opposing side walls of the casing to form a gap between the sections and a plunger assembly disposed within said gap and electrically coupled to the stator sections to reciprocally drive the plunger assembly in a reciprocating stroke manner between said opposed end walls;
    a pair of spaced apart U-shaped flexure springs each having two legs and a body portion, each spring affixed at the legs to opposing side walls of the casing so that the body portion of the spring extends between the sidewalls;
    said plunger assembly having one end attached to the body portion of one flexure spring and an opposite end attached to the body portion of the other flexure spring to suspend the plunger assembly between said flexure springs and support said plunger assembly during each reciprocating stroke;
    a plurality of staged compression cylinders mounted in said end walls, each cylinder containing a close fitting piston;
    connection means for driving each piston to compress the working fluid in the staged cylinders, said connecting means connected to each end of the plunger assembly and operatively associated with each piston so that each piston reciprocates with said plunger assembly;
    flow means for sequentially passing a working fluid through each of the staged compression cylinders, wherein the area of each piston in the sequence is smaller than the area of the preceding piston; and
    means for balancing the compression forces acting on each end of the plunger assembly including positioning said compression cylinders in opposed end walls according to a relationship between the piston areas and the cylinder pressures whereby the natural frequency of the plunger assembly is substantially equal to the exciting frequency of the linear motor.

2. The compressor of claim 1, wherein said connection means comprise push rods aligned in parallel with the reciprocating stroke of said plunger assembly and maintained in contact against said pistons by the motor force on the compression stroke and the cylinder pressure on the suction stroke to thereby accommodate misalignment of said rods and pistons.

3. The compressor of claim 1, wherein the overall compression ratio is the range of 1000 to 1.

4. The compressor of claim 1, wherein two compression cylinders are mounted in one end wall and one compression cylinder is mounted in the other end wall whereby the compressor has three compression stages.

5. The compressor of claim 1, further comprising a fluid tight housing containing a coolant wherein the casing and the flow means are contained within the fluid tight housing to cool the casing and the working fluid passing through said flow means.

6. The compressor of claim 1, wherein each flexure spring has a width to length ratio sufficiently larger to resist transverse forces on the plunger unit.

7. The compressor of claim 1, wherein the flexure springs have a spring stiffness that maintains the natural frequency of the plunger unit equal to the exciting frequency of the linear motor at a preselected compressor input and output pressure such that the compressor operates in resonance.

8. A four stage reciprocating compressor comprising:
    a casing with side walls and two opposed end walls;
    a linear motor having split stator sections affixed to opposing side walls of the casing to form a gap between the sections and a plunger assembly disposed within said gap and electrically coupled to the stator sections to reciprocally drive the plunger assembly in a reciprocating stroke manner between said opposed end walls;
    a pair of spaced apart U-shaped flexure springs each having two legs and a body portion, each spring affixed at the legs to opposing side walls of the casing so that the body portion of the spring extends between the side walls;
    said plunger assembly having one end attached to the body portion of one flexure spring and an opposite end attached to the body portion of the other flexure spring to suspend the plunger assembly between said flexure springs and support said plunger assembly during each reciprocating stroke;
    four compression cylinders including two compression cylinders mounted in each end wall;
    a close fitting piston contained in each cylinder, each piston operatively reciprocating with said plunger assembly;
    flow means for sequentially passing a working fluid through each of the four compression cylinders, wherein the area of each piston in the sequence is smaller than the area of the preceding piston; and
    four push rods including two push rods connected to each end of the plunger assembly for driving the pistons to compress the working fluid in the compression cylinders wherein two compression cylinders are positioned in each opposed end wall according to a relationship between the piston areas and the cylinder pressures to balance the forces acting on each end of the plunger assembly whereby the natural frequency of the plunger assembly is substantially equal to the exciting frequency of the linear motor.

* * * * *